Jan. 24, 1933. E. F. WESTON 1,895,114
ELECTRICAL MEASURING INSTRUMENT
Filed Jan. 12, 1931 3 Sheets-Sheet 1
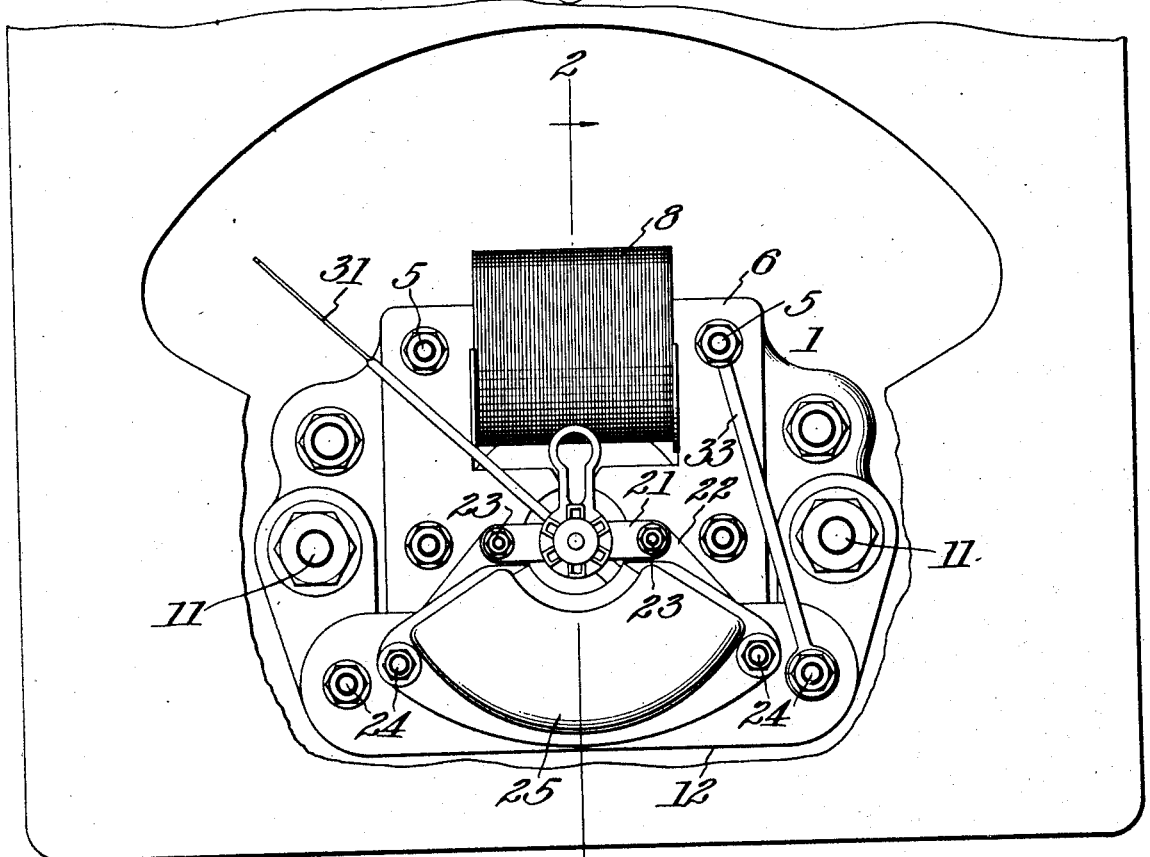
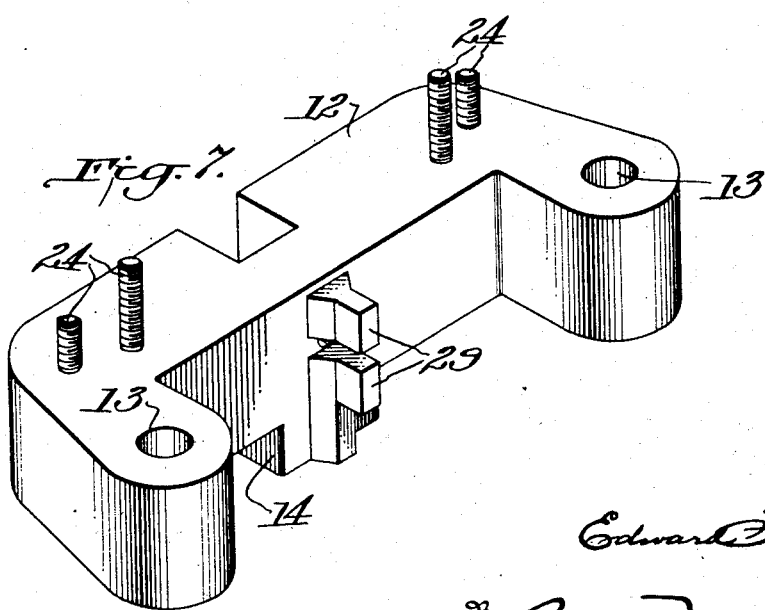
Inventor:
Edward F. Weston,
By Bymes Townsend & Potter,
Attorneys.

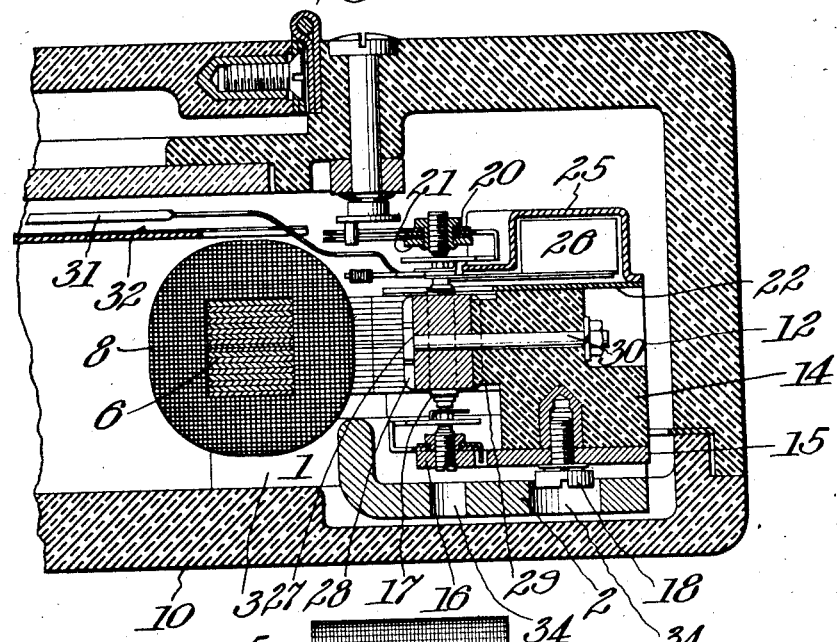

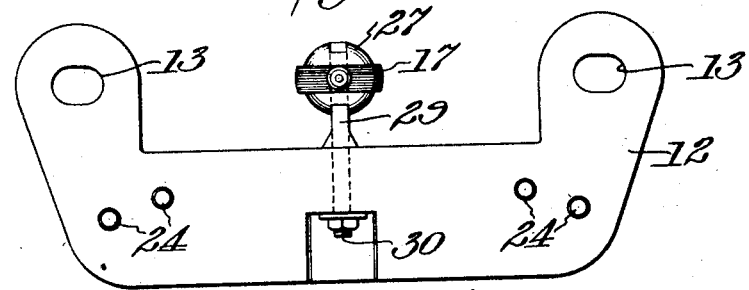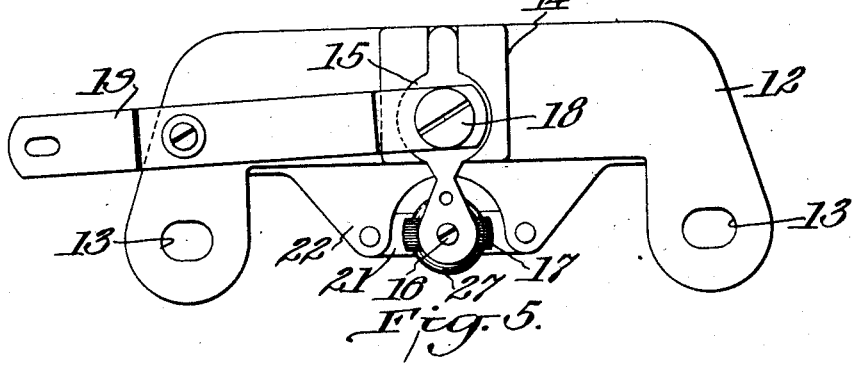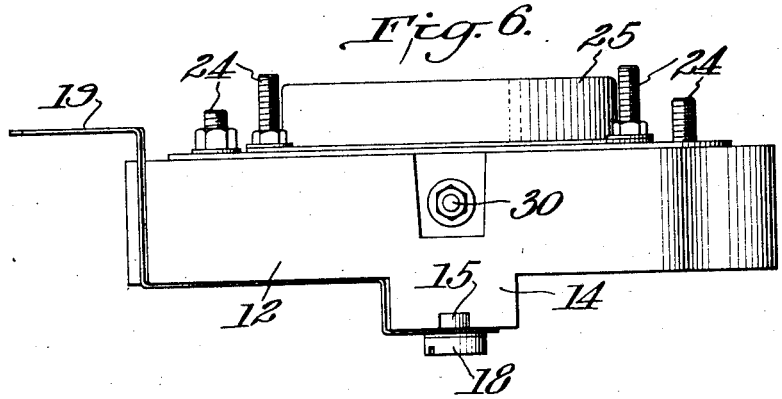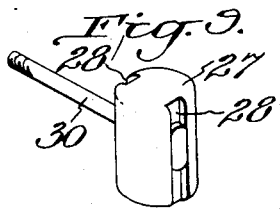

Patented Jan. 24, 1933

1,895,114

UNITED STATES PATENT OFFICE

EDWARD F. WESTON, OF NEWARK, NEW JERSEY, ASSIGNOR TO WESTON ELECTRICAL INSTRUMENT CORPORATION, OF NEWARK, NEW JERSEY, A CORPORATION OF NEW JERSEY

ELECTRICAL MEASURING INSTRUMENT

Application filed January 12, 1931. Serial No. 508,228.

This invention relates to electrical measuring instruments of the movable coil type, and more particularly to a construction designed to eliminate difficulties in manufacture.

In assembling movable coil measuring instruments, it is convenient to be able to test the coil assembly before it has been assembled with the magnet and other elements. It has already been proposed to accomplish this desired result by assembling the movable coil and pointer system upon its core and, after testing this preliminary assembly, to fit the magnet over the coil. In some instruments, particularly alternating current instruments, the magnet is of such relatively small size that it becomes impossible to fit the magnet over the moving coil and pointer system as a step in the assembly.

An object of this invention is to provide electrical measuring instruments which may be conveniently tested before final assembly. A further object of this invention is to provide an electrical measuring instrument which may be readily assembled in such a manner that it will not be necessary to completely take down the instrument when a fault in the finished instrument is discovered by a test.

These and other objects will be apparent from the following specification when taken with the accompanying drawings in which:

Fig. 1 is a fragmentary plan view of the instrument embodying the invention,

Fig. 2 is a section taken on the line 2—2 of Fig. 1,

Fig. 3 is a plan view of the magnet assembly,

Figs. 4 and 5 are top and bottom plan views of the coil assembly,

Fig. 6 is an elevation of the coil assembly,

Fig. 7 is a fragmentary perspective view of the coil and core support,

Fig. 8 is an elevation of the magnet base, and

Fig. 9 is a perspective view of the core.

According to this invention, the magnet and its associated parts are assembled on the supporting base and the movable coil and its associated parts are assembled into another unit which may be secured to the base without disturbing the magnet assembly. The two units may thus be separately tested, if desired, before any further steps in the assembly of the complete instrument are undertaken.

In the drawings, the numeral 1 indicates the metal stamping which constitutes the magnet base upon which the magnet, and thereafter the assembled moving system, are mounted. As best shown in Figs. 2 and 8, the central portion 2 of the base is depressed below the side flanges 3 and two shallow grooves 4 extend laterally from the central depression 2. A group of threaded studs 5 are fixed in the magnet base 1 for securing the laminated yoke 6 to the base, and a boss 7 is provided at the base of each stud to space the yoke slightly above the base. The central portion 2 of the base stops short of the side flanges 3 to provide space for the field winding 8, see Fig. 2, and the side flanges are apertured, as at 9, to receive the studs or bolts, not shown, for securing the magnet base to the bottom wall 10 of the instrument casing. The magnet base has fixed thereto a pair of studs 11 by which the moving coil system and its supporting structure may be mounted, as a unit, on the magnet base.

As shown in Figs. 4 to 7, the coil support comprises a wide and shallow yoke 12, preferably molded from a synthetic reactive resin, which has openings 13 in the ends of the yoke for receiving the threaded studs 11 of the magnet base. A lug 14 depends below the central portion of the yoke 12, and its lower face is recessed to receive the plate 15 which supports the lower bearing 16 for the moving coil 17. As best shown in Fig. 5, the portion of the lower supporting plate 15 which projects beyond the yoke 12 conforms in shape, but is of somewhat smaller size than the transverse cross-section of the cylindrical gap between the poles of the magnet 6. The screw 18 which holds the plate 15 on the yoke 12 also assists in securing the terminal strip 19 through which one electrical connection is made to the coil 17.

The upper bearing for the coil and the zero adjustment, identified generically by the reference numeral 20, are mounted on a narrow strap 21 which is supported from, and somewhat above the plate 22 by short posts 23. The plate 22 is apertured to receive the studs 24 that project above the top face of the yoke 12 for attaching the plate 22 and the plate 25, which cooperates therewith, to form the damping chamber for the vane 26 of the moving coil system.

The cylindrical iron core 27 has oppositely disposed longitudinal grooves 28, one groove permitting the core 27 to fit over the rib 29 which projects from yoke 12, while the other groove receives the flattened end of the bolt 30 which secures the core to the yoke.

The moving system includes a pointer 31 movable over an appropriate scale 32 and, as shown in Figs. 1 and 2, the pointer extends considerably beyond the magnet 6 and winding 8. As stated above, one terminal of the moving coil is electrically connected to the lead 16 which contacts with the lower bearing support, and the second coil terminal is in circuit with the upper bearing support, and the strap 33 which connects the plate 22 to the magnet yoke.

So far as concerns the present invention, any appropriate circuit connections may be established to the field winding 8 and the moving coil 17, and the instrument may be mounted in a case or upon a panel of any desired style.

An instrument embodying the invention may be assembled in the following manner. The field winding 8 and laminated yoke 6 are assembled and mounted on the magnet base 1, as shown in Fig. 3. The parts may be tested to make certain that the magnetic system functions properly.

The moving system is separately assembled by mounting the core 27 on yoke 12, attaching the bearing supports to the upper and lower faces of yoke 12, and then mounting the moving coil in its bearings. Plate 25 is then secured to the upper plate 22 to complete the moving system. After testing the same, the moving system is mounted on the magnet base and, since the yoke 12 is relatively thick, the engagement of the studs 11 with the walls of the openings 13 constrains the entire unit to move substantially parallel to the axis of the coil system and of the cylindrical gap between the poles of magnet 6, thus preventing damage to the coil and its mountings.

The central portion 2 of the base 1 is apertured, as shown at 34 in Fig. 3, to permit adjustment of the lower bearing 16 and the screw 18. In assembled position, the lug 14 of the yoke extends into the depressed central portion 2 of the base 1, and the yoke rests within the grooves 4. If desired, the complete magnet and coil system may be tested before assembling the same in the instrument casing.

Not only the assembly, but the inspection and, when necessary, the repair of instruments are facilitated when the construction is such that the moving system may be removed, as a unit from the magnet system.

It will be apparent that the invention is not limited to the particular embodiment herein described and illustrated as many changes in the parts, their relative size, shape and location may be made without departing from the spirit of the invention as set forth in the following claims.

I claim:

1. In an electrical measuring instrument, the combination with a magnet base having a central portion depressed below the side flanges thereof, a magnet mounted on said base and having a gap overlying the central portion thereof, of a moving system mounted on said base and removable as a unit therefrom without disturbing said magnet, said system comprising a yoke of insulating material removably secured to the side flanges of said base, a core and coil positioned within the gap of said magnet, and means supporting said core and coil from said yoke.

2. In an electrical measuring instrument, the combination of a base, a magnet carried by said base and having opposed pole pieces, pins projecting from said base on opposite sides of said magnet, a yoke of non-magnetic material having holes to receive said pins, and a core and coil unit mounted on said yoke, the yoke being slidable upon said pins to carry said core and coil unit into and out of position between said pole pieces.

3. In an electrical measuring instrument, the combination of a magnet base, a pin projecting from each side of said base, a magnet having opposed pole pieces mounted on said base between said pins, a yoke having two forwardly projecting arms, holes in the arms to receive said pins, and a core and coil unit mounted on said yoke between said arms, the yoke being slidable on said pins to carry said core and coil unit into and out of position between said pole pieces.

4. In an electrical measuring instrument, the combination of a magnet base, two pins projecting from said base, a magnet having opposed pole pieces mounted on said base, a yoke having two forwardly projecting arms, holes in the arms to receive said pins, and a core and coil unit mounted on said yoke between said arms, the yoke being slidable on said pins to carry said core and coil into and out of position between said pole pieces.

5. In an electrical measuring instrument, the combination of a magnet base having a central portion depressed below and shorter than the sides thereof, a plurality of pins projecting from said base, a magnet mounted on said base and having a gap overlying the central portion thereof, a winding on said magnet at a portion thereof lying between the projecting sides of said base, and a moving system mounted on said base and removable therefrom as a unit without disturbing the magnet, said system comprising a yoke having holes to slidably receive said pins, a core and coil unit movable into and out of the gap of said magnet as the yoke slides on said pins and means to support said core and coil on said yoke.

6. In an electrical measuring instrument, the combination of a magnet base having side flanges, a central portion depressed below the side flanges, pins projecting from each side flange and disposed on opposite sides of said central portion, a magnet having a gap overlying said central portion mounted on said base between said pins, a yoke having two forwardly projecting arms, holes in the arms to receive said pins, and a core and coil unit mounted on said yoke between said arms, the yoke being slidable upon said pins to carry the core and coil unit into and out of position within said gap.

7. In an electrical measuring instrument, the combination of a magnet base having a central portion depressed below the sides thereof, a plurality of pins projecting from said base, a magnet mounted on said base by some of said pins and having a gap overlying the central portion thereof, and a moving system mounted on said base and removable therefrom as a unit without disturbing the magnet, said system comprising a yoke having holes to slidably receive others of said pins, a lug depending therefrom and received within said depressed central portion of said base, a core and coil unit movable into and out of the gap of said magnet as the yoke slides on said pins, and means to support said core and coil on said yoke.

8. In an electrical measuring instrument, the combination of a magnet base, two pins projecting from said base, a magnet having opposed pole pieces mounted on said base, a yoke having two forwardly projecting arms, holes in the arms to receive said pins, a rib projecting from said yoke between said arms, a core comprising a cylinder having a longitudinal groove for receiving said rib, means to secure said core to said rib, a coil pivoted to oscillate about said core, the yoke being slidable on said pins to carry said core and coil into and out of position between said pole pieces.

9. In an electrical measuring instrument, the combination of a base having a central portion depressed below the sides thereof, a plurality of pins projecting from said base, a magnet mounted on said base and having a gap overlying the central portion thereof, and a moving system mounted on said base and removable therefrom as a unit without disturbing the magnet, said system comprising a yoke having holes to receive said pins, a rib projecting from said yoke, a core comprising a cylinder having a longitudinal groove receiving said rib, means to secure said core to said rib, a coil pivoted to oscillate about said core, a lug depending from said yoke and received within said depressed central portion, and a pivotal support for said coil carried by said lug, the yoke being slidable upon said pins to carry said core and coil into and out of position within said gap.

10. In an electrical measuring instrument, the combination with a magnet having a gap between the poles thereof, a moving system assembly comprising a yoke, a core comprising a cylinder having a longitudinal groove, a rib projecting from said yoke and received within the groove of said core, means to secure the core to the rib, an upper and lower support carried by said yoke, and a coil mounted on said supports for pivotal movement about the axis of said core, one of said supports being of less size than the gap between the poles of the magnet, whereby said moving system may be applied to or removed from the instrument as a unit.

In testimony whereof, I affix my signature.

EDWARD F. WESTON.